June 10, 1958 H. D. AYLWARD 2,838,138
SLED BRAKE
Filed July 23, 1954
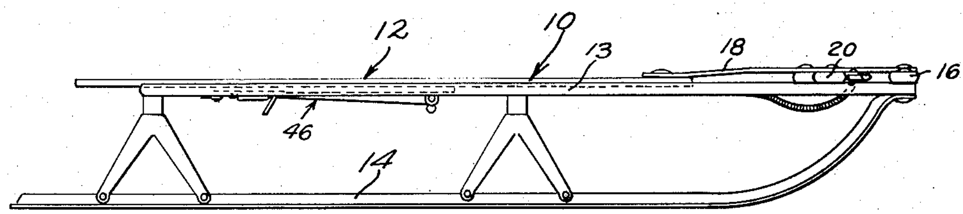
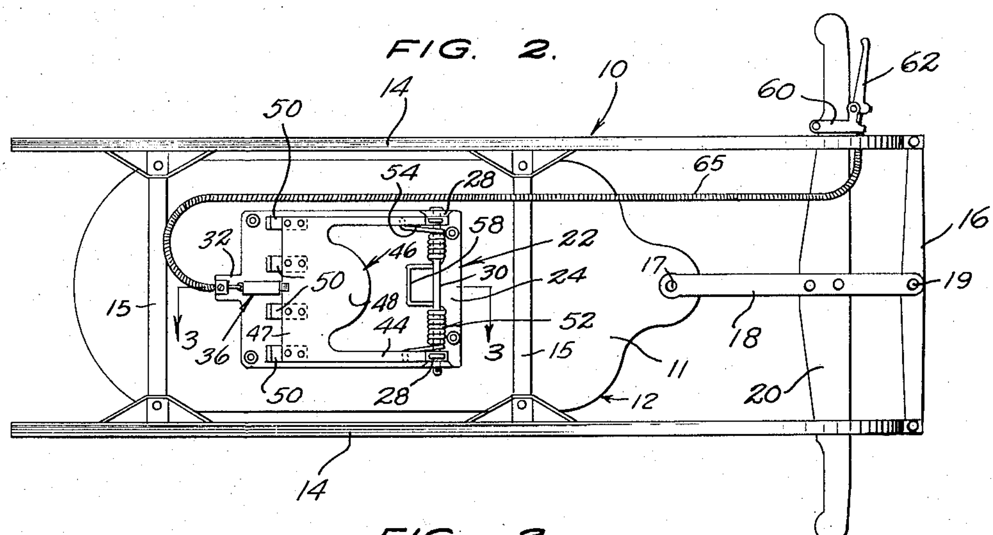
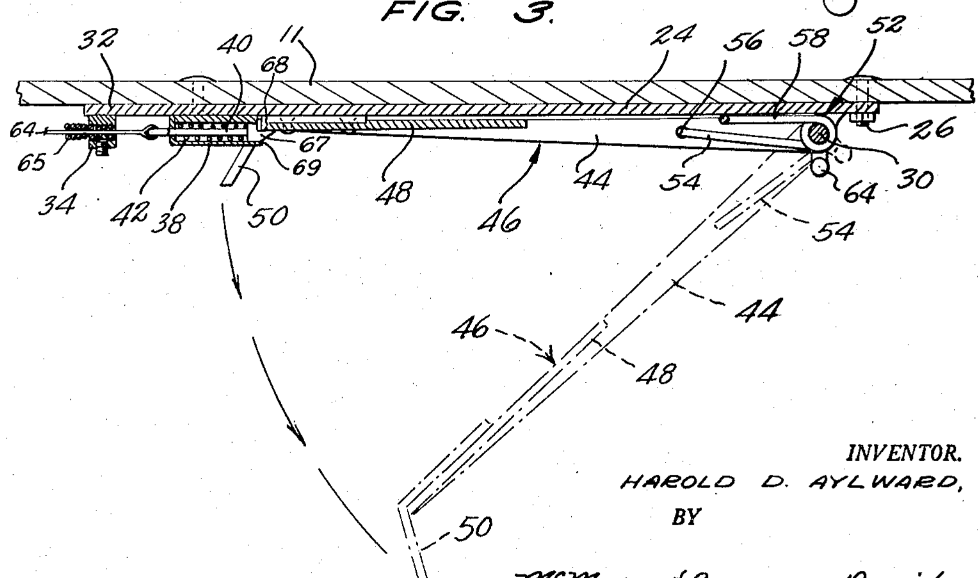
INVENTOR.
HAROLD D. AYLWARD,
BY
McMorrow, Berman + Davidson
ATTORNEYS.

United States Patent Office 2,838,138

Patented June 10, 1958

2,838,138

SLED BRAKE

Harold D. Aylward, Dedham, Mass.

Application July 23, 1954, Serial No. 445,381

4 Claims. (Cl. 188—8)

This invention relates to an improved sled brake.

The primary object of the invention is to provide a generally superior sled brake unit for easy application to conventional sleds of the dirigible or steerable type without substantial alteration of the structure of the sled.

Another important object of the invention is to provide a more efficient and positively operating device of this kind which can be made in rugged and serviceable forms at relatively low cost, and which is easily applied to and removed from a sled.

Other objects and advantageous features of the invention will be apparent from the following description and the accompanying drawings, wherein, for purposes of illustration only, a specific form of the invention is set forth in detail.

In the drawings:

Figure 1 is a side view of a sled equipped with an improved sled brake unit in accordance with the present invention;

Figure 2 is a bottom plan view of Figure 1; and

Figure 3 is an enlarged fragmentary longitudinal sectional view taken substantially on the line 3—3 of Figure 2.

Referring to the drawings in detail, a sled 10 comprises a platform 12 including a center board 11 and side rails 13, cross bars 15, and flexible runners 14. The runners and rails have portions which project forwardly beyond the forward end of the center board 11 and are connected together at their forward ends by a transversely extending bar 16. A steering lever 18 is pivotally coupled to the forward end of the center board 11 at 17 and to the bar 16 at 19, and a transverse steering bar 20 is fixed to the lever 18 at a point intermediate the ends of the lever 18. The structure thus far defined is conventional and forms no part of this invention except in combination therewith.

The illustrated brake is preferably in the form of a unit 22 and comprises a base plate 24 of rectangular formation which is secured in any suitable manner as by fasteners 26 to the underside of the center board 11 at a point spaced rearwardly from the lever 18 and between the cross bars 15. Carried by and depending from the plate 24 adjacent the forward end thereof are transversely spaced ears 28 traversed by a pivot rod 30. Carried by the plate 24 and extending rearwardly from the rear end thereof is an extension 32 carrying a clamp 34, the purpose of which will hereinafter appear.

Fixed on the underside of the base plate 24 adjacent to and forwardly of the clamp 34 is a latch designated generally 36 comprising a latch housing 38 in which is slidably mounted a latch bar 40 which is yieldingly urged forwardly by a compressed coil spring 42 which is housed within the latch housing 38.

Mounted at their forward ends on the pivot shaft 30 outwardly of the ears 28 are the forward ends of arms 44 which have fixed between their rear ends a plate 48 having a straight transverse rear edge 47. Fixed to the upper side of the plate 48 and transversely spaced along the rear edge 47 are lugs having teeth 50 which extend rearwardly and downwardly beyond the rear edge 47. Circumposed on the pivot rod 30 between the ears 28 is a torsion coil spring 52, opposite ends of which are provided with rearwardly extending legs 54 whose rear ends engage in openings 56 formed in the arms 44. The spring 52 is formed intermediate its ends with a rearwardly extending U-shaped leg 58 which, as illustrated in Figure 2, bears upwardly against the underside of the center board 11 and cooperates with the legs 54 in urging the brake frame 46 downwardly so as to put the teeth 50 into engagement with the surface upon which the sled is operated.

Secured as by a clamp 60 to the one end of the steering bar 20 outside of one of the rails 13 of the sled is a hand lever 62 which is located in front of the bar 20 and is connected by the wire 64 of a conventional Bowden cable 64 to the rear end of the latch bar 40, so that when the hand lever 62 is retracted toward the steering bar 20, the latch bar will be moved rearwardly to release the brake frame 46 to be moved downwardly by the spring 52 to braking position. The rear end of the sheath 65 of the cable 64 is secured in the clamp 34. Suitable stops 64 depending from the ears 28 are arranged to be engaged by the brake frame arms 44 to arrest downward movement of the frame 46 after it has attained a predetermined angular operative position with relation to the plate 24. On the forward end of the latch bar 40 is a head 67 which in the latching position of the latch bar, is engaged beneath the brake frame plate 48 at the rear edge 47.

In use, it will be evident that when the sled 10 is equipped with the above described improved sled brake, and the user wishes to arrest forward movement of the sled, rearward pull is exerted on the hand lever 62 so as to exert pull on the wire 64 of the Bowden cable and retract the latch bar 40 against the resistance of the spring 42 and disengage the head 67 from the rear edge of the plate 48 of the brake frame 46, so as to permit the spring 52 to move the frame 46 downwardly away from the base plate 24 and cause the teeth 50 to bite into the surface over which the sled is being operated.

The latch head 67 and the rear edge 47 of the brake frame plate 48 have oppositely beveled cam surfaces 69 and 68, respectively, so that when the frame 46 is moved upwardly toward the underside of the base plate 24 to an inoperative position, the latch head will become engaged under the plate 48.

While in the foregoing there has been shown and described the preferred embodiment of this invention, it is to be understood that minor changes in the details of construction, combination and arrangement of parts may be resorted to without departing from the spirit and scope of the appended claims.

What is claimed is:

1. In a sled brake unit, a base plate adapted to be secured to the underside of the center board of a steerable sled, a transverse pivot rod mounted on and positioned beneath said base plate at the forward end thereof, a brake frame comprising a pair of laterally spaced arms having first ends mounted on said pivot rod and having second ends, a brake frame plate fixed on and extending between said arms at their second ends, said frame plate having a transverse edge at the second ends of said arms, teeth secured to the frame plate and extending downwardly from the transverse edge, a latch secured to and positioned beneath the rearward end of the base plate in the region of said transverse edge, said latch comprising a spring pressed latch bar having a first end retainably engageable beneath said frame plate at said transverse edge and a second end, spring means mounted on said pivot rod having portions effectively engaged severally with said brake frame arms and the base plate and urging said brake frame away from the base plate, and manual retracting means operatively connected to the second end of the latch bar.

2. In a sled brake unit, a base plate adapted to be secured to the underside of the center board of a steerable sled, a transverse pivot rod mounted on and positioned beneath said base plate at the forward end thereof, a brake frame comprising a pair of laterally spaced arms having first ends mounted on said pivot rod and having second ends, a brake frame plate fixed on and extending between said arms at their second ends, said frame plate having a transverse edge at the second ends of said arms, teeth secured to the frame plate and extending downwardly from the transverse edge, a latch secured to and positioned beneath the rearward end of the base plate in the region of said transverse edge, said latch comprising a spring pressed latch bar having a first end retainably engageable beneath said frame plate at said transverse edge and a second end, spring means mounted on said pivot rod having portions effectively engaged severally with said brake frame arms and the base plate and urging said brake frame away from the base plate, and manual retracting means operatively connected to the second end of the latch bar, said manual means comprising a pivoted hand lever adapted to be mounted on the steering bar of a steerable sled, and a flexible cable connected at one end to said hand lever and at its other end to the second end of the latch bar.

3. In a sled brake unit, a base plate adapted to be secured to the underside of the center board of a steerable sled, a transverse pivot rod mounted on and positioned beneath said base plate at the forward end thereof, a brake frame comprising a pair of laterally spaced arms having first ends mounted on said pivot rod and having second ends, a brake frame plate fixed on and extending between said arms at their second ends, said frame plate having a transverse edge at the second ends of said arms, teeth secured to the frame plate and extending downwardly from the transverse edge, a latch secured to and positioned beneath the rearward end of the base plate in the region of said transverse edge, said latch comprising a spring pressed latch bar having a first end retainably engageable beneath said frame plate at said transverse edge and a second end, spring means mounted on said pivot rod having portions effectively engaged severally with said brake frame arms and the base plate and urging said brake frame away from the base plate, and manual retracting means operatively connected to the second end of the latch bar, said first end of the latch bar having a head thereon, the transverse edge of the frame plate and said latch head having oppositely beveled cam surfaces arranged to engage as the frame is manually moved toward said base plate to an inoperative position from an operative position and retract the latch bar and engage the latch head beneath the frame plate to retain the brake frame in inoperative position.

4. In combination, a steerable sled having flexible runners having forward ends, a platform mounted on the runners including a center board having a forward end spaced rearwardly from the forward ends of the runners, a cross bar extending between and connected to the forward ends of the runners, a steering lever pivoted at its forward end to the cross bar and at its rear end to the forward end of the center board, a transverse steering bar fixed to the steering lever at a point intermediate the ends of the lever, said center board having an underside, a single base plate secured to the underside of the center board and having forward and rear ends, a transverse pivot rod mounted on and positioned beneath the base plate at the forward end thereof, a brake frame comprising laterally spaced arms having forward ends mounted on the pivot rod and rear ends, a brake plate extending between and fixed to the rear ends of said arms, said brake plate having a transverse rear edge, teeth secured to the brake plate and reaching rearwardly and downwardly beyond said transverse edge, a latch secured to the underside of the base plate rearwardly of said transverse edge, said latch comprising a forwardly spring pressed latch bar having a rear end and a forward end, and steering bar mounted means operatively connected with the rear end of said latch bar.

References Cited in the file of this patent

UNITED STATES PATENTS

| | | |
|---|---|---|
| 1,517,967 | Edmonds | Dec. 2, 1924 |
| 1,896,966 | Mate et al. | Feb. 7, 1933 |
| 2,160,502 | Heffner et al. | May 30, 1939 |
| 2,188,030 | Berthiaume | Jan. 23, 1940 |